(12) United States Patent
Lu

(10) Patent No.: US 12,489,616 B2
(45) Date of Patent: Dec. 2, 2025

(54) METHOD AND APPARATUS FOR GENERATING WORKING KEY, AND COMPUTER-READABLE STORAGE MEDIUM

(71) Applicant: FEITIAN TECHNOLOGIES CO., LTD., Beijing (CN)

(72) Inventor: Zhou Lu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 31 days.

(21) Appl. No.: 18/288,049

(22) PCT Filed: Jun. 28, 2022

(86) PCT No.: PCT/CN2022/101736
§ 371 (c)(1),
(2) Date: Oct. 24, 2023

(87) PCT Pub. No.: WO2023/040410
PCT Pub. Date: Mar. 23, 2023

(65) Prior Publication Data
US 2024/0214193 A1    Jun. 27, 2024

(30) Foreign Application Priority Data
Sep. 16, 2021 (CN) .......................... 202111083495.5

(51) Int. Cl.
*H04L 9/08* (2006.01)
(52) U.S. Cl.
CPC .................. *H04L 9/0861* (2013.01)
(58) Field of Classification Search
CPC ................................................ H04L 9/0861
See application file for complete search history.

(56) References Cited

U.S. PATENT DOCUMENTS

| 2014/0013124 A1* | 1/2014 | Little | H04L 9/0863 |
| | | | 713/189 |
| 2020/0169401 A1* | 5/2020 | Dooley | H04L 9/0822 |
| (Continued) | | | |

FOREIGN PATENT DOCUMENTS

| CN | 108573176 A | * | 9/2018 | ............. G06F 21/79 |
| CN | 109495260 A | * | 12/2018 | |
| (Continued) | | | | |

*Primary Examiner* — Darshan I Dhruv
(74) *Attorney, Agent, or Firm* — J. Clinton Wimbish; Maynard Nexsen PC

(57) ABSTRACT

The invention provides a working key generation method and device and a computer readable storage medium, and belongs to the technical field of information security. The method comprises the following steps: the terminal receiving an operation instruction sent by an upper computer, obtaining a working key purpose and a working key algorithm according to the operation instruction, setting the working key purpose as a first purpose by the terminal, generating derived data according to the first purpose, a master key identifier, a first numerical value and a master key algorithm, determining the length of a working key according to the working key algorithm, obtaining data in a working key buffer area as a key, generating the working key according with the length of the working key according to the key and the derived data, executing corresponding operation according to the operation instruction and the working key, and returning an operation result to the upper computer. Compared with an encryption scheme in the prior art, the method provided by the invention is safer and wider in application range.

15 Claims, 5 Drawing Sheets

(56) References Cited

U.S. PATENT DOCUMENTS

2020/0401721 A1* 12/2020 Snyder ................ G06F 21/6227
2021/0226923 A1* 7/2021 Samid ....................... H04L 9/12

FOREIGN PATENT DOCUMENTS

CN         1094955260 A  * 12/2018
JP          2016103799 A  *  6/2016  ............... H04L 9/18

* cited by examiner

METHOD AND APPARATUS FOR GENERATING WORKING KEY, AND COMPUTER-READABLE STORAGE MEDIUM

TECHNICAL FIELD

The present invention relates to a method for generating a working key, an apparatus for generating a working key, and computer-readable storage medium therefor, which belongs to information security field.

BACKGROUND ART

In a process of data interacting between a terminal device and a host, it requires encrypting solution for the transferred data, especially for the sensitive data which needs encrypting processing. At present, the encrypting solution required is simple, for example, when a terminal device leaves factory, a fixed key is imported to the terminal device, and the interacting process requires the fixed key for encrypting. Once the fixed key of the terminal device is leaked out, a user of the terminal device faces big loss, therefore, the solution adapting the fixed key to encrypt data will lower security of the terminal device. In addition, in the prior art, using the fixed key in the terminal device to derive a working key is adapted, which relies on algorithm of the fixed key and limits using of the working key subsequently.

SUMMARY OF THE INVENTION

The object of the present invention is to provide a method for generating a working key, an apparatus for generating a working key, and computer-readable storage medium therefor, which is securer and has a wider application scope.

According to one aspect of the present invention, there is provided a method for generating a working key, which includes:

Step S1, a terminal receives an operating instruction sent from a host, acquires a master key value, a master key counter value and a master key algorithm according to a key index in the operating instruction;

Step S2, the terminal processes the master key counter value according to a first preset algorithm to obtain a master key identification and a first value;

Step S3, the terminal initializes a working key buffer, stores the master key value in the working key buffer, sets the working key counting value, initializes a shift register, sets a current bit of the shift register;

Step S4, the terminal determines whether value of a bit, which corresponds to the current bit of the shift register, in the first value equals to a second preset value, if yes, execute Step S5; otherwise, executes Step S8;

Step S5, the terminal performs computation according to the value of the current shift register and the working key counting value to obtain a first result, updates the working key counting value to be the first result, execute Step S6;

Step S6, the terminal generates a first derived data according to the master key identification, the updated working key counting value and the master key algorithm;

Step S7, the terminal determines derived key length according to the master key algorithm, takes data in the working key buffer as a first key, generates data conformed to the derived key length according to the first key and the first derived data, updates the data in the working key buffer to be the data conformed to the derived key length, execute Step S8;

Step S8, the terminal determines whether the current bit of the shift register is the last bit of the shift register, if yes, execute Step S9, if no, control the shift register to shift bit according to preset direction, update the current bit of the shift register, go back to Step S4;

Step S9, the terminal sets the working key usage to be a first usage according to the operating instruction, generates a second derived data according to the first usage, the master key identification, the first value and the master key algorithm, execute Step S10; and Step S10, the terminal acquires a working key algorithm according to the operating instruction, determines working key length according to the working key algorithm, takes data in the working key buffer as a second key, generates a working key according to the second key and the second derived data, performs corresponding operation according to the operating instruction and the working key, returns an operating result to the host.

According to a second aspect of the present invention, there is provided an apparatus for generating a working key, which includes:

a receiving module configured to receive an operating instruction sent from a host;

an acquiring module configured to acquire a master key value, a master key counter value and a master key algorithm according to a key index in the operating instruction;

a processing module configured to process the master key counter value according to a first preset algorithm to obtain a master key identification and a first value;

a setting module configured to initialize a working key buffer, store the master key value in the working key buffer, set the working key counting value, initialize a shift register, set a current bit of the shift register;

a first determining module configured to determine whether value of a bit, which corresponds to the current bit of the shift register, in the first value equals to a second preset value;

a computing module configured to perform computation according to the value of the current shift register and the working key counting value to obtain a first result, update the working key counting value to be the first result;

a generating module configured to generate a first derived data according to the master key identification, the updated working key counting value and the master key algorithm;

the generating module further configured to determine derived key length according to the master key algorithm, take data in the working key buffer as a first key, generate data conformed to the derived key length according to the first key and the first derived data, update the data in the working key buffer to be the data conformed to the derived key length;

a second determining module configured to determine whether the current bit of the shift register is the last bit of the shift register, a controlling module configured to control the shift register to shift bit according to preset direction, update the current bit of the shift register when the second determining module determines that the current bit of the shift register is not the last bit of the shift register;

the generating module further configured to set the working key usage to be a first usage according to the operating instruction, generate a second derived data according to the first usage, the master key identification, the first value and the master key algorithm;

the generating module further configured to acquire a working key algorithm according to the operating instruction, determine working key length according to the working key algorithm, take data in the working key buffer as a second key, generate a working key according to the second key and the second derived data; and a performing module configured to perform corresponding operation according to the operating instruction and the working key, return an operating result to the host.

According to a third aspect of the present invention, there is provided an electronic device, which includes:

a storage configured to store computer readable instructions, and a processor configured to run the computer readable instructions to enable the processor to perform the method for generating a working key of the present application when the computer readable instructions are executed by the processor.

According to a fourth aspect of the present invention, there is provided a computer readable storage medium, which is configured to store computer readable instructions, when the computer readable instructions run on the computer, to enable the computer to perform the method for generating a working key of the present invention.

In the present invention, an algorithm of the working key and a working key usage are determined according to the operating instruction sent from the host; different working keys are determined according to different working key algorithm and working key usage; the data in the working key buffer are iterated and updated according to the shift register in a process of generating a working key, in order to ensure that the working key generated is unique in each operating process. Compared with an encrypting solution of prior art, i.e. generating a working key with a fixed algorithm of a fixed key, the method provided in the present invention is safer and can be more widely used.

PREFERRED EMBODIMENTS

The technical solutions in the embodiments of the present disclosure will be clearly and completely described in the following with reference to the accompanying drawings in the embodiments of the present disclosure. It is obvious that the described embodiments are only a part of the embodiments of the present disclosure, but not all embodiments. All other embodiments obtained by those skilled in the art based on the embodiments of the present disclosure without inventive efforts are within the scope of protection.

Embodiment 1

Figure 1:
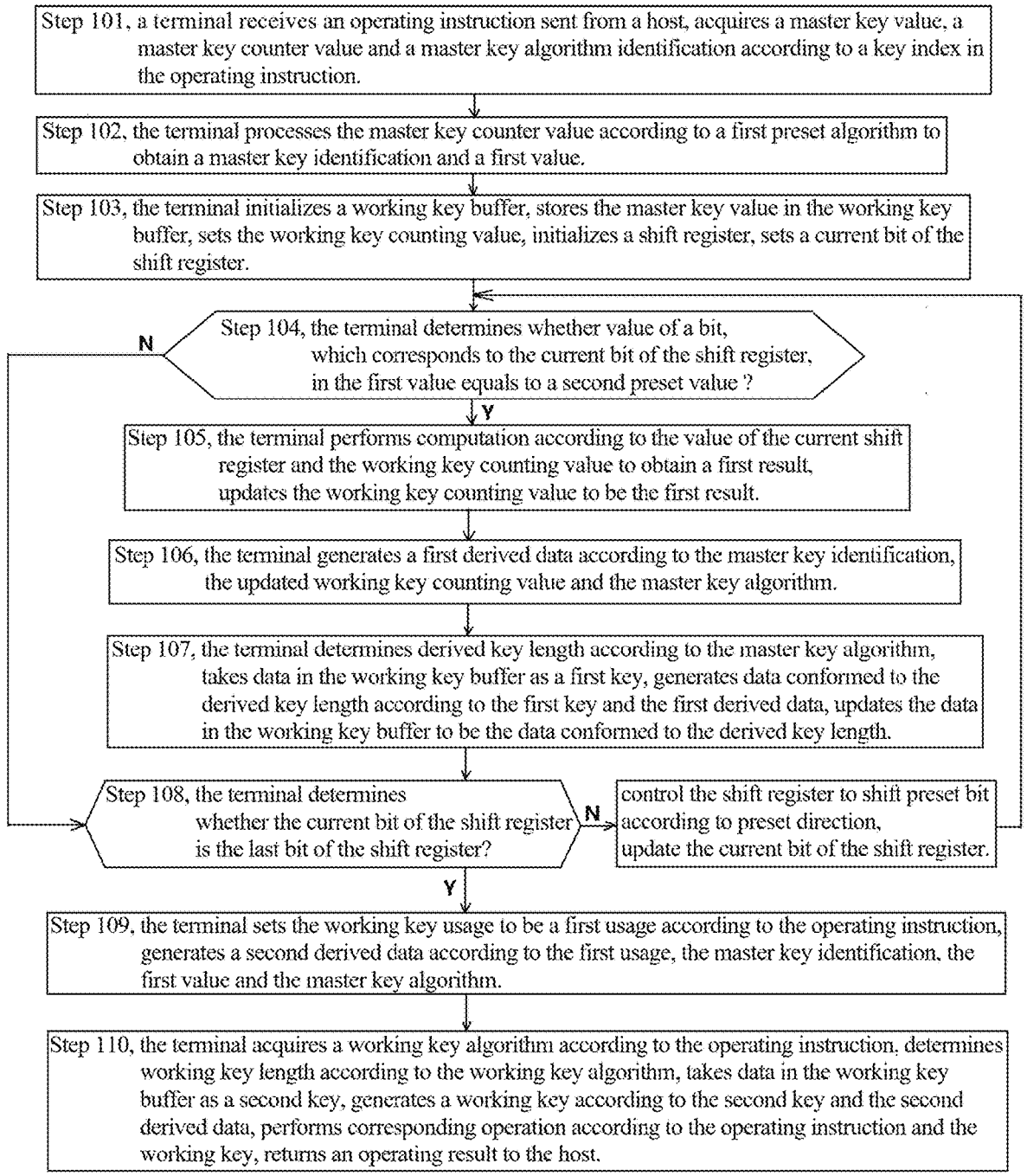
FIG. 1 is a flow chart of a method for generating a working key of Embodiment 1 of the present invention.

Embodiment 1 of the present invention provides a method for generating a working key. As shown in FIG. 1, the method includes the following steps.

Step 101, a terminal receives an operating instruction sent from a host, acquires a master key value, a master key counter value and a master key algorithm identification according to a key index in the operating instruction.

In Embodiment 1, the operating instruction includes: a data encrypting instruction, a data decrypting instruction, a PIN code encrypting instruction, a Mac check value generating instruction or a verifying instruction, etc.

In Embodiment 1, acquiring a master key value, a master key counter value and a master key algorithm identification according to a key index in the operating instruction specifically includes: acquiring a master key according to a key index in the operating instruction and acquiring a master key value, a master key counter value and a master key algorithm identification according to the master key.

Preferably, acquiring the master key according to the key index in the operating instruction specifically includes: the terminal acquires a key index in the operating instruction, searches for data corresponding to the key index via the key index in the key container, takes the found data as the master key.

For example, the master key value is: FEDCBA9876543210F1F1F1F1F1F1F1F 101020304050607080807060504030201;

the master key counter value is: 0FFFF9876543210E00010004; and the master key algorithm identification is 0x06.

Step 102, the terminal processes the master key counter value according to a first preset algorithm to obtain a master key identification and a first value.

In Embodiment 1, the master key counter value specifically is data of 12 bytes.

Step 102 specifically is: the terminal separates the master key counter value into two parts, takes the first 8 bytes as the master key identification, takes the last 4 bytes as the first value.

For example, the master key counter value is: 0FFFF9876543210E00010004;

the master key identification is: 0FFFF9876543210E; and the first value is: 00010004.

Step 103, the terminal initializes a working key buffer, stores the master key value in the working key buffer, sets the working key counting value, initializes a shift register, sets a current bit of the shift register.

In Embodiment 1, initializing current bit of the shift register specifically includes: setting the highest bit of the shift register as current bit.

For example, the value of the shift register is: 0x80000000; and the working key counting value is: 0x00000000;

Step 104, the terminal determines whether value of a bit, which corresponds to the current bit of the shift register, in the first value equals to a second preset value, if yes, execute Step 105, otherwise, execute Step 108.

In the present Embodiment 1, the terminal determines whether value of a bit, which corresponds to the current bit of the shift register, in the first value equals to a second preset value specifically is: the terminal acquires a value of current bit of the shift register and a value of a bit, which corresponds to the current bit of the shift register, in the first value, performs computation on the value of the current bit of the shift register and the value of a bit, which corresponds to the current bit of the shift register, in the first value according to a second preset algorithm to obtain a second value, determines whether the second value is more than a third preset value, if yes, the value of the bit, which corresponds to the current bit of the shift register, in the first value equals to a second preset value, execute Step 106, if no, the value of the bit, which corresponds to the current bit of the shift register, in the first value does not equal to the second preset value.

Specifically, the second preset algorithm is And operation, the third preset value is 0, the second preset value is 1, the value of the current bit of the shift register is 1.

For example, if the current bit of the shift register is the second bit, the bit, which corresponds to the current bit of the shift register, in the first value is also the second bit.

Step 105, the terminal performs computation according to the value of the current shift register and the working key counting value to obtain a first result, updates the working key counting value to be the first result, execute Step 106.

In Embodiment 1, the terminal performs computation according to the value of the current shift register and the working key counting value to obtain a first result specifically is: the terminal performs computation on the value of the current shift register and the working key counting value according to a third preset algorithm to obtain a first result.

In this case, the third preset algorithm specifically is Or operation;
the value of the current shift register is: 0x 80 00 00 00;
the working key counting value is: 0x 00 00 00 00; and
the first result is: 0x 80 00 00 00.

Step 106, the terminal generates a first derived data according to the master key identification, the updated working key counting value and the master key algorithm.

In Embodiment 1, the terminal generates a first derived data according to the master key identification, the updated working key counting value and the master key algorithm specifically includes: the terminal generates a first derived data according to key derived usage, the master key identification, the updated working key counting value and the master key algorithm.

Preferably, generating a first derived data according to key derived usage, the master key identification, the updated working key counting value and the master key algorithm specifically is: the terminal concatenates a fourth preset value, the key derived usage, a value corresponding to the master key algorithm, a preset byte value of the master key identification and the updated working key counting value orderly to obtain data of a preset length.

Specifically, the preset length is 6 bytes.

Preferably, the terminal concatenates a fourth preset value, the key derived usage, a value corresponding to the master key algorithm, a preset byte value of the master key identification and the updated working key counting value orderly to obtain data of a preset length specifically is: the terminal initializes the first byte and the second byte to obtain a fourth preset value, takes a value corresponding to the key derived usage as the third byte and the fourth byte, takes a value corresponding to the master key algorithm as the fifth byte, the sixth byte and the seventh byte and the eighth byte, takes fourth bytes after the master key identification as the ninth byte, the tenth byte, the eleventh byte and the twelfth byte, takes the updated working key counting value as the thirteenth byte, the fourteenth byte, the fifteenth byte and the sixteenth byte.

In Embodiment 1, the fourth preset value is: 0x01.

In Embodiment 1, the key derived usage specifically is a value, which represents that the key usage value is key deriving; the value corresponding to the key derived usage is, for example, 0x80 0x00.

Specifically, the master key algorithm includes AES-128, AES-192, AES-256; the value corresponding to the master key algorithm is: 0x00 0x02 0x00 0x80, 0x00 0x03 0x00 0x00, 0x00 0x04 0x01 0x00.

In Embodiment, specifically, AES-256 is taking as an example;
the master key identification is: 0FFFF9876543210E;
the four bytes after the master key identification is: 00010004;
the updated working key counting value for the first time is: 0x10000:
the first derived data generated for the first time is: 01 01 80 00 00 04 01 00 65 43 21 0e 00 01 00 00;
the updated working key counting value for the second time is: 0x10004; and
the first derived data generated for the second time is: 01 01 80 00 00 04 01 00 65 43 21 0e 00 01 00 04.

Step 107, The terminal determines derived key length according to the master key algorithm, takes data in the working key buffer as a first key, generates data conformed to the derived key length according to the first key and the first derived data, updates the data in the working key buffer to be the data conformed to the derived key length, executing Step 108.

In Embodiment 1, before Step 107, the method further includes: the terminal sets derived key algorithm to be master key algorithm.

In Embodiment 1, preferably, generating data conformed to the derived key length according to the first key and the first derived data specifically includes: regarding data conformed to the derived key length as a target key, determining multiple of the length of the target key and the first derived data length, generating a first derived data group according to the multiple and the first derived data, encrypting the first derived data group according to the first key to obtain data conformed to the derived key length.

Preferably, if the multiple is an integral multiple, generating a first derived data group according to the multiple and the first derived data, encrypting the first derived data group according to the first key to obtain data conformed to the derived key length specifically includes: generating a first derived data group containing the integral multiple of data units according to the first derived data, encrypting each data unit of the derived data group according to the first key, concatenating the obtained ciphertext orderly to obtain data conformed to the derived key length.

Preferably, if the multiple is a non-integral multiple, generating a first derived data group according to the multiple and the first derived data, encrypting the first derived data group according to the first key to obtain data conformed to the derived key length specifically includes: rounding up the non-integral multiple to obtain an integral multiple, generating a derived data group containing the integral multiple number of data units according to the first derived data, encrypting each data unit of the derived data group according to the first key, concatenating the obtained ciphertext orderly, taking data with length of target key length from the concatenated ciphertext as the data conformed to the derived key length.

Further and preferably, generating a derived data group containing the integral multiple number of data units according to the first derived data specifically includes:

Step P1, initializing sequence number of a current data unit, regarding the first derived data as a data unit of the derived data group;

Step P2, determining whether the number of the data units of the derived data group equals to an integral multiple, if yes, generating process is ended; otherwise, execute Step P3; and Step P3, updating the sequence number of the current data unit, modifying a preset byte of the first derived data to be the sequence number of the current data unit, taking the modified derived data as a data unit of the derived data group, go back to Step P2.

For example, the algorithm of the derived key is master key algorithm, i.e. the derived key algorithm is: AES-256.

In Embodiment 1, the counting value of the working key obtained by circulating for the first time is: 0x10000.

The derived data is: 01 01 80 00 00 04 01 00 65 43 21 0e 00 01 00 00.

In this case, the length of the target key is 32 bytes, determining that the multiple of the length of the target key, i.e. 32 bytes, and the first derived data length, i.e. 16 bytes, is 2, generating a first derived data group, i.e. 01 01 80 00 00 04 01 00 65 43 21 0e 00 01 00 00, 01 02 80 00 00 04 01 00 65 43 21 0e 00 01 00 00, according to the multiple, i.e. 2, and the first derived data, encrypting each data unit of the derived data group according to the first key, i.e. FEDCBA9876543210F1F1F1F1F1F1F1F1F010203 040506070808807060504030201, to obtain ciphertext data, i.e. 5d 05 a2f3 a6 4d dc c9 57 93 81 c6 a4 e2 79 6d, 3418 faf8 e0 54 3b ca 42 af bc 80 5a 56 58 4d, concatenating the ciphertext orderly to obtain data conformed to the derived key length, i.e. 5d 05 a2 f3 a6 4d dc c9 57 93 81 c6 a4 e2 79 6d 34 18 fa f8 e0 54 3b ca 42 af bc 80 5a 56 58 4d.

In the embodiment 1, the counting value of the working key obtained by circulating for the second time is: 0x10004;

the derived data is: 01 01 80 00 00 04 01 00 65 43 21 0e 00 01 00 04;

the ciphertext obtained by encrypting the first data unit of the derived data group via the first key is: 78 bc fa c1 46 e1 98 82 5f fd 68 98 b3 63 9f 68;

the ciphertext obtained by encrypting the second data unit of the derived data group via the first key is: d4 f3 1d de dd 84 8a 1f b7 19 ad 1819 21 b4 69; and the data, which is obtained by concatenating the ciphertext orderly, conformed to the derived key length is: 78 bc fa c1 46 e1 98 82 5f fd 68 98 b3 63 9f 68 d4 f3 1d de dd 84 8a 1f b719 ad 1819 2f b4 69.

Step 108, the terminal determines whether the current bit of the shift register is the last bit of the shift register, if yes, execute Step 109, if no, control the shift register to shift preset bit according to preset direction, update the current bit of the shift register, go back to Step 104.

In Embodiment 1, specifically, the preset direction can be toward right or toward left, or from high bit to low bit, the preset bit specifically is 1 bit.

Step 109, the terminal sets the working key usage to be a first usage according to the operating instruction, generates a second derived data according to the first usage, the master key identification, the first value and the master key algorithm, execute Step 110.

In Embodiment 1, generating a second derived data according to the first usage, the master key identification, the first value and the master key algorithm specifically is: the terminal concatenates the fourth preset value, the first usage, the value corresponding to the master key algorithm, the value of the preset byte of the master key identification and the first value orderly to obtain data with preset length.

In Embodiment 1, the working key usage includes: key encrypting, PIN code encrypting, Mac generating, Mac authenticating, Mac generating and authenticating, data encrypting, data decrypting, data encrypting and decrypting, key deriving, the values corresponding to the working key usage are: 0x00 0x02, 0x10 0x00, 0x20 0x00, 0x20 0x01, 0x20 0x02, 0x30 0x00, 0x30 0x01, 0x30 0x02, 0x80 x00.

In Embodiment 1, PIN code encrypting is specifically taken as example of the first usage for illustration.

For example, the value corresponding to the PIN code encrypting is: 0x10 0x00;

the master key identification is: 0FFFF9876543210E;

the first value is: 00010004:

the master key algorithm is: AES-256; and the generated second derived data is: 01 01 10 00 00 04 01 00 65 43 21 0e 00 01 00 04.

Step 110, the terminal acquires a working key algorithm according to the operating instruction, determines working key length according to the working key algorithm, takes data in the working key buffer as a second key, generates a working key according to the second key and the second derived data, performs corresponding operation according to the operating instruction and the working key, returns an operating result to the host.

In Embodiment 1, PIN code is taken as example, the operating instruction received by the terminal is: 25 21 00 00 00 13 00 01 30 00 06 01 00 00 02.

Specifically, the terminal acquires the working key usage, the working key algorithm identification by parsing according to the operating instruction.

In this case, the first byte and the second byte in the operating instruction are command type and command code, which are for identifying data encrypting/decrypting command; the third byte in the operating instruction is operating code, for example, 00 represents encrypting; 01 represents decrypting; the fourth byte in the operating instruction is a fixed value; the fifth byte and the sixth byte in the operating instruction represent data length, the high byte is at the front, the low byte is at behind, it supposed to be 0 byte; the seventh byte and the eighth byte in the operating instruction represent the master key index, for example, 0001; the ninth byte and the tenth byte in the operating instruction represent working key usage, for example, 3000; the eleventh byte in the operating instruction is working key algorithm identification, for example, 06 represents AES-256 algorithm; the twelfth byte in the operating instruction is algorithm mode, for example, 01 represents ECB mode; the thirteenth byte and fourteenth byte in the operating instruction represent initial vector length, not using, for example, 0000; the fifteenth byte in the operating instruction is filling mode, for example, 02.

The working key algorithm can include: AES-128, AES-192, AES-256, 3DES128, 3DES192; for example, when the working key algorithm is AES-128, the working key algorithm identification is 0x04; when the working key algorithm is AES-192, the working key algorithm identification is 0x05; when the working key algorithm is AES-256, the working key algorithm identification is 0x06.

In Embodiment 1, if the working key algorithm is AES-128 or 3DES128, the length of the working key is 16 bytes; if the working key algorithm is AES-192 or 3DES192, the length of the working key is 24 bytes; if the working key algorithm is AES-256, the length of the working key is 32 bytes.

In Embodiment 1, if the operating instruction is PIN code encrypting, performing corresponding operation according to the operating instruction and the data in the working key buffer, returning an operating result to the host specifically is: the terminal acquires PIN code, takes data acquired from the working key buffer as key, performs encrypting on the PIN code according to the key and a preset encrypting algorithm to obtain PIN code ciphertext, sends the PIN code ciphertext to the host.

In Embodiment 1, preferably, generating a working key conformed to working key length according to the second key and the second derived data specifically is: regarding the working key as target key, determining multiple of the length of the target key and the second derived data length, generating a second derived data group according to the multiple and the second derived data, encrypting the second derived data group according to the second key to obtain working key conformed to the working key length.

Preferably, if the multiple is an integral multiple, generating a second derived data group according to the multiple and the second derived data, encrypting the second derived data group according to the second key to obtain working key conformed to the working key length specifically includes: generating derived data group containing the integral multiple of data units according to the second derived data, encrypting each data unit of the derived data group according to the second key, concatenating the obtained ciphertext orderly to obtain working key conformed to the working key length.

Preferably, if the multiple is a non-integral multiple, generating a second derived data group according to the multiple and the second derived data, encrypting the second derived data group according to the second key to obtain working key conformed to the working key length specifically includes: rounding up the non-integral multiple to obtain an integral multiple, generating a derived data group containing the integral multiple number of data units according to the second derived data, encrypting each data unit of the derived data group according to the second key, concatenating the obtained ciphertext orderly, taking data with length of target key length from the concatenated ciphertext as the working key conformed to the working key length.

Further and preferably, generating a derived data group containing the integral multiple number of data units according to the second derived data specifically includes:

Step P1, initializing sequence number of a current data unit, regarding the second derived data as a data unit of the derived data group;

Step P2, determining whether the number of the data units of the derived data group equals to an integral multiple, if yes, generating process is ended; otherwise, execute Step P3; and Step P3, updating the sequence number of the current data unit, modifying a preset byte of the second derived data to be the sequence number of the current data unit, takes the modified derived data as a data unit of the derived data group, go back to Step P2.

Embodiment 2

Figure 2:
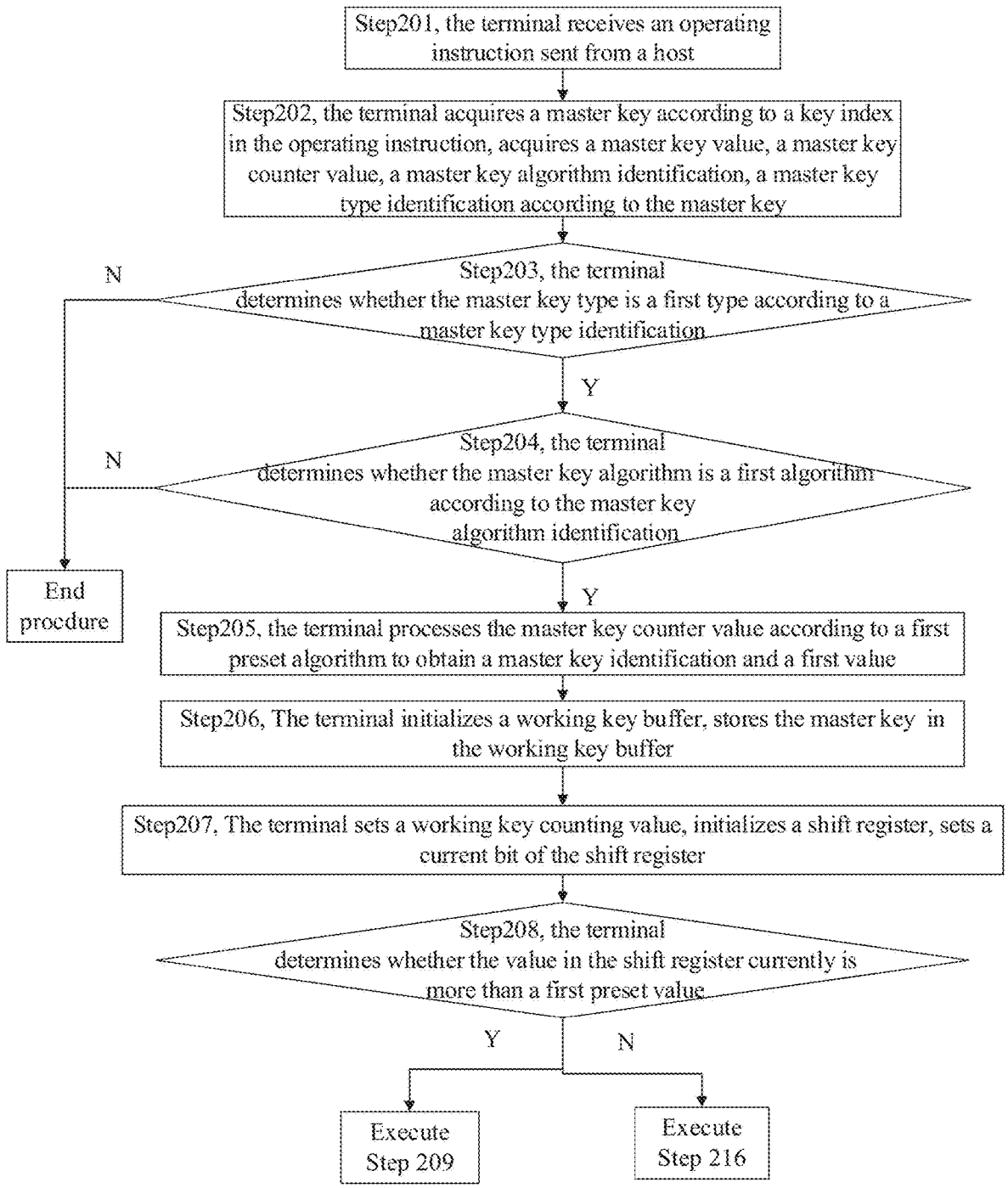
FIG. 2, FIG. 3 and FIG. 4 are flow charts of a method for generating a working key of Embodiment 2 of the present invention.
Figure 3:
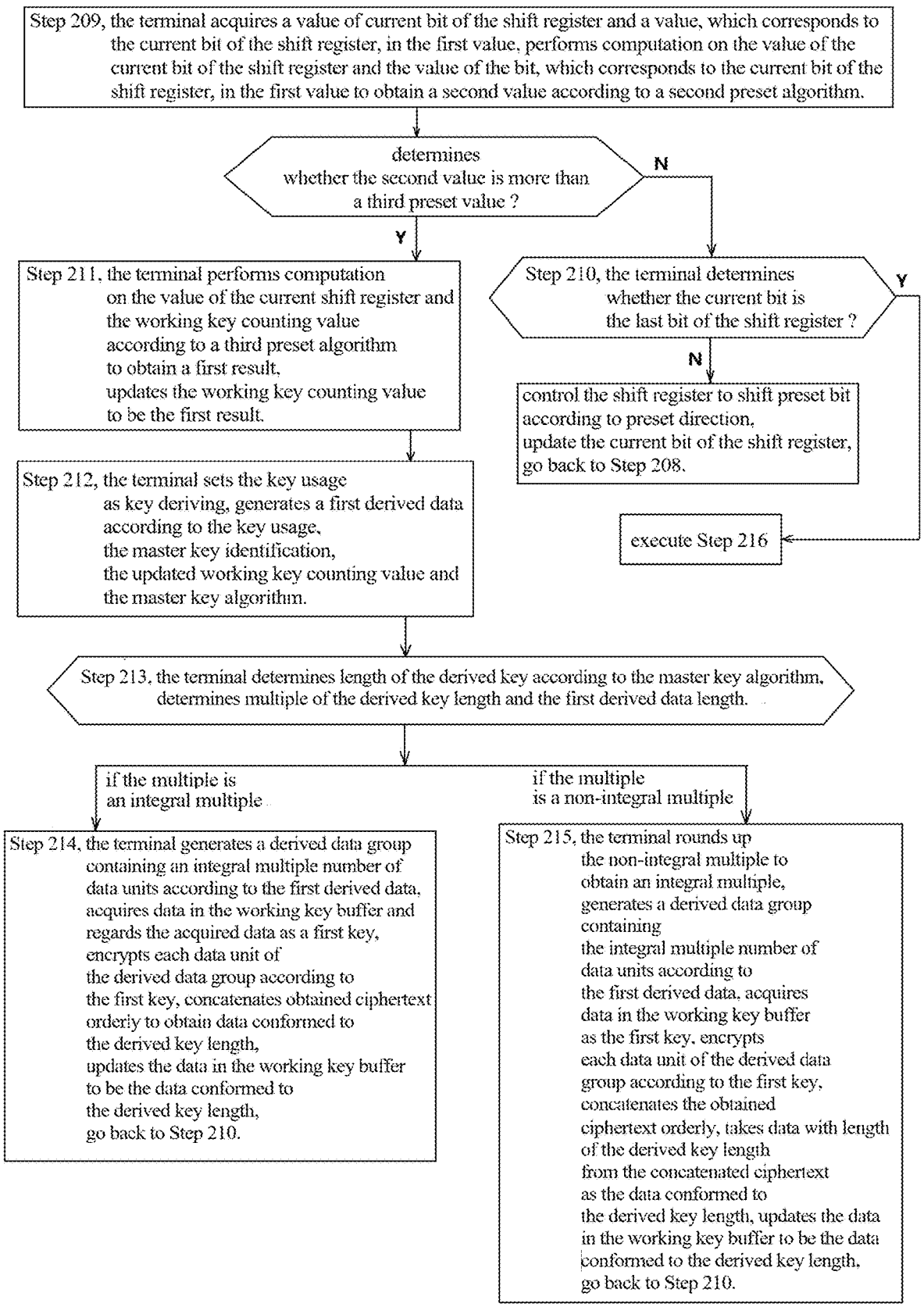
Figure 4:
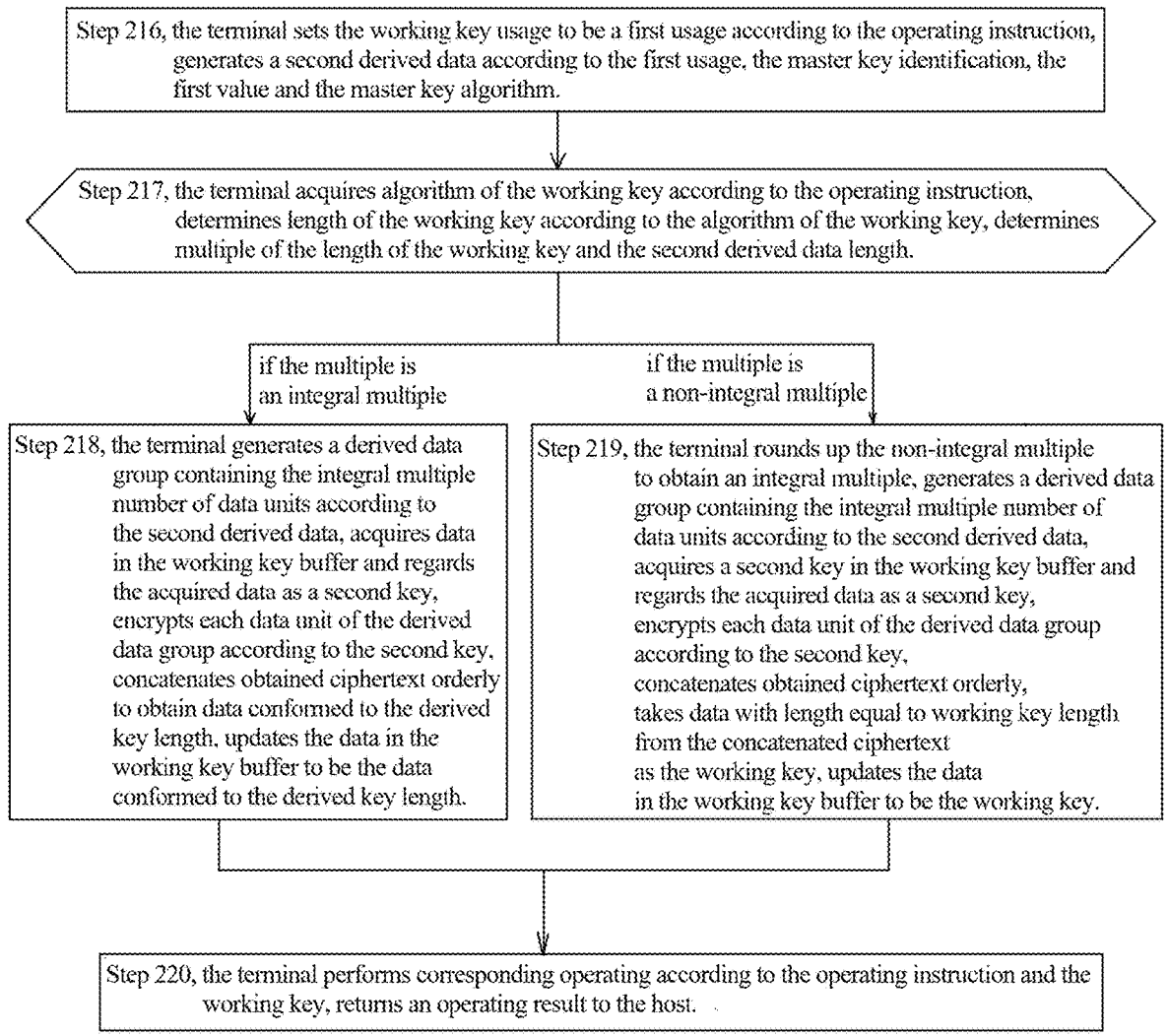

Embodiment 2 of the present invention provides a method for generating a working key. As shown in FIG. 2, FIG. 3 and FIG. 4, the method includes the following steps.

Step 201, the terminal receives an operating instruction sent from a host.

In Embodiment 2, the operating instruction specifically includes: a data encrypting instruction, a data decrypting instruction, a Mac check value generating instruction or an authenticating instruction, etc.

Step 202, the terminal acquires a master key according to a key index in the operating instruction, acquires a master key value, a master key counter value, a master key algorithm identification, a master key type identification according to the master key.

In Embodiment 2, the terminal acquires a master key according to a key index in the operating instruction specifically is: the terminal acquires a key index in the operating instruction, searches for data corresponding to the key index via the key index in a key container, regards the found data as a master key.

In Embodiment 2, the master key counter value may be variable according to the instruction sent from the host.

For example, after the terminal receives a command of "KSN increase by degrees", the terminal increases counter part of the master key counter value.

For example, the master key algorithm identification is: 0x06;

the master key value is: FEDCBA9876543210F1F1F1F1F1F1F1F101 0203040506070808070605040302 01; and the master key counter value is: 0FFFF9876543210E00010004.

Step 203, the terminal determines whether the master key type is a first type according to a master key type identification, if yes, execute Step 204, otherwise, end procedure:

In Embodiment 2, the first type is key which is initially written in and can encrypt PIN code.

Step 204, the terminal determines whether the master key algorithm is a first algorithm according to the master key algorithm identification, if yes, execute Step 205, otherwise, end procedure.

In Embodiment 2, the first algorithm can be AES algorithm, SM4 algorithm.

Specifically, in Embodiment 2, specifically, for example, the first algorithm is AES-256.

Step 205, the terminal processes the master key counter value according to a first preset algorithm to obtain a master key identification and a first value.

In Embodiment 2, the master key counter value specifically is data with 12 bytes.

Step 205 specifically is: the terminal separates the master key counter value into two parts, regards the first eight bytes as the master key identification, regards the last four bytes as the first value.

For example, the master key counter value is: 0FFFF9876543210E00010004;

the master key identification is: 0FFFF9876543210E; and the first value is: 00010004.

Step 206, The terminal initializes a working key buffer, stores the master key value in the working key buffer.

Step 207, The terminal sets a working key counting value, initializes a shift register, sets a current bit of the shift register.

In Embodiment 2, setting a current bit of the shift register specifically is: setting the highest bit of the shift register as current bit.

For example, the value of both of the shift register and the working key counting number is 4, the value of the shift register is: 0x80000000; and the value of the working counting number is: 0x00000000.

Step 208, the terminal determines whether the value in the shift register currently is more than a first preset value, if yes, execute Step 209, otherwise, execute Step 216.

In Embodiment 2, the value of shift register currently is 0x80000000; and the first preset value specifically is 0.

Step 209, the terminal acquires a value of current bit of the shift register and a value, which corresponds to the current bit of the shift register, in the first value, performs computation on the value of the current bit of the shift register and the value of the bit, which corresponds to the current bit of the shift register, in the first value to obtain a second value according to a second preset algorithm, determines whether the second value is more than a third preset value, if yes, execute Step 211, otherwise, execute Step 210.

In Embodiment 2, the second preset algorithm is And operation.

The value of the current bit of the shift register is 1, the value of the bit, which corresponds to the current bit of the shift register, in the first value is 1, the third preset value is 0.

Step 210, The terminal determines whether the current bit is the last bit of the shift register, if yes, execute Step 216, otherwise, control the shift register to shift preset bit according to preset direction, update the current bit of the shift register, go back to Step 208.

Preferably, the preset direction can be toward right, toward left or from high bit to low bit.

Specifically, in Embodiment 2, control the shift register to shift 1 bit toward right.

Step 211, the terminal performs computation on the value of the current shift register and the working key counting value according to a third preset algorithm to obtain a first result, updates the working key counting value to be the first result, execute Step 212.

In Embodiment 2, the third preset algorithm specifically is OR operation;

the value of the shift register currently is: 0x 80 00 00 00;
the working key counting value is: 0x 00 00 00 00; and
the first result is 0x 80 00 00 00.

Step 212, the terminal sets the key usage as key deriving, generates a first derived data according to the key usage, the master key identification, the updated working key counting value and the master key algorithm.

In Embodiment 2, generating a first derived data according to the key usage, the master key identification, the updated working key counting value and the master key algorithm specifically is: the terminal concatenates a fourth preset value, the key deriving usage, a value corresponding to the master key algorithm, a preset byte value of the master key identification and the updated working key counting value orderly to obtain data with preset length.

Specifically, the length of the generated first derived data specifically is 16 bytes.

Specifically, the terminal concatenates a fourth preset value, the key deriving usage, a value corresponding to the master key algorithm, a preset byte value of the master key identification and the updated working key counting value orderly to obtain data with preset length specifically is: the terminal initializes the first byte and the second byte to obtain a fourth preset value, takes a value corresponding to the key derived usage as the third byte and the fourth byte, takes a value corresponding to the master key algorithm as the fifth byte, the sixth byte and the seventh byte and the eighth byte, takes fourth bytes after the master key identification as the ninth byte, the tenth byte, the eleventh byte and the twelfth byte, takes the updated working key counting value as the thirteenth byte, the fourteenth byte, the fifteenth byte and the sixteenth byte.

In Embodiment 2, the fourth preset value is: 0x01 0x01.

In Embodiment 2, the key usage includes: the working key usage includes: key encrypting, PIN code encrypting, Mac generating, Mac authenticating, Mac generating and authenticating, data encrypting, data decrypting, data encrypting and decrypting, key deriving, the values corresponding to the working key usage are: 0x0 0x02, 0x10 0x00, 0x20 x0, 0x20 0x01, 0x20 0x02, 0x30 0x00, 0x30 0x01, 0x30 0x02, 0x80 0x00.

Specifically, the master key algorithm includes: AES-128, AES-192, AES-256, the value corresponding to the master key algorithm is: 0x00 0x02 0x00 0x80, 0x00 0x03 0x00 0x00, 0x00 0x04 0x01 0x00.

In Embodiment 2, the master key algorithm specifically is AES-256;
the master key identification is: 0FFFF9876543210E;
the last four bytes of the master key counter value is: 00010004;
the working key counting value updated for the first time is: 0x10000;
the first deriving data generated for the first time is: 01 01 80 00 00 04 01 00 65 43 21 0e 00 01 00 00;
the working key counting value updated for the second time is: 0x10004; and the first derived data generated for the second time is: 01 01 80 00 00 04 01 00 65 43 21 0e 00 01 00 04.

Step 213, the terminal determines length of the derived key according to the master key algorithm, determines multiple of the derived key length and the first derived data length, if the multiple is an integral multiple, execute Step 214, if the multiple is a non-integral multiple, execute Step 215.

In Embodiment 2, the derived key length is 16 bytes, the length of the first derived data is 16 bytes, the multiple of the derived key length and length of the first derived data is 1; if the derived key length is 24 bytes, length of the first derived data is 16 bytes, the multiple of the derived key length and the length of the first derived data is 1.5; if the derived key length is 32 bytes, length of the first derived data is 16 bytes, the multiple of the derived key length and the length of the first derived data is 2.

Step 214, the terminal generates a derived data group containing an integral multiple number of data units according to the first derived data, acquires data in the working key buffer and regards the acquired data as a first key, encrypts each data unit of the derived data group according to the first key, concatenates obtained ciphertext orderly to obtain data conformed to the derived key length, updates the data in the working key buffer to be the data conformed to the derived key length, go back to Step 210.

In Embodiment 2, generating a derived data group containing an integral multiple number of data units according to the first derived data specifically includes:

Step P1, initializing sequence number of a current data unit, regarding the first derived data as a data unit of the derived data group;

Step P2, determining whether the number of the data units of the derived data group equals to an integral multiple, if yes, generating process is ended; otherwise, execute Step P3; and Step P3, updating the sequence number of the current data unit, modifying a preset byte of the first derived data to be the sequence number of the current data unit, taking the modified derived data as a data unit of the derived data group, go back to Step P2.

Step 215, the terminal rounds up the non-integral multiple to obtain an integral multiple, generates a derived data group containing the integral multiple number of data units according to the first derived data, acquires data in the working key buffer as the first key, encrypts each data unit of the derived data group according to the first key, concatenates the obtained ciphertext orderly, takes data with length of the derived key length from the concatenated ciphertext as the data conformed to the derived key length, updates the data in the working key buffer to be the data conformed to the derived key length, go back to Step 210.

In Embodiment 2, algorithm of the derived key is master key algorithm, i.e. the derived key algorithm is AES-256.

In Embodiment 2, the counting value of the working key obtained by circulating for the first time is: 0x10000; and
the first derived data is: 01 01 80 00 00 04 01 00 65 43 21 0e 00 01 00 00.

In this case, the length of the target key is 32 bytes, determining that the multiple of the length of the target key, i.e. 32 bytes, and the first derived data length, i.e. 16 bytes, is 2; according to the first derived data, generating a derived data group, i.e. 01 01 80 00 00 04 01 00 65 43 21 0e 00 01 00 00, 01 02 80 00 00 04 01 00 65 43 21 0e 00 01 00 00, containing an integral multiple number, i.e. 2, of data units; encrypting each data unit of the derived data group according to the first key, i.e. FEDCBA9876543210F1F1F1F1F1F1F1F1101020304050 607080807060504030201, to obtain ciphertext data, i.e. 5d 05 a2 f3 a6 4d dc c9 57 93 81 d6 a4 e2 79 6d, 3418 fa f8 e0 54 3b ca 42 af bc 80 5a 56 58 4d: concatenating the ciphertext orderly to obtain data conformed to the derived key length, i.e. 5d 05 a2 f3 a6 4d dc c9 57 93 81 c6 a4 e2 79 6d 3418 fa f8 e0 54 3b ca 42 af bc 80 5a 56 58 4d.

In Embodiment 2, the counting value of the working key obtained by circulating for the second time is: 0x10004;
the derived data is: 01 01 80 00 00 04 01 00 65 43 21 0e 00 01 00 04;

The ciphertext obtained by encrypting the first data unit of the derived data group according to the first key is: 78 bc fa c1 46 e1 98 82 5f fd 68 98 b3 63 9f 68;
the ciphertext obtained by encrypting the second data unit of the derived data group according to the first key is: d4f3 1d de dd 84 8a 1f b7 19 ad 18 19 2f b4 69; and
the data, which is obtained by concatenating the ciphertext orderly, conformed to the derived key length is: 78 bc fa c1 46 e1 98 82 5f fd 68 98 b3 63 9f 68 d4 f3 1d de dd 84 8a 1f b719 ad 1819 2f b4 69.

Step 216, the terminal sets the working key usage to be a first usage according to the operating instruction, generates a second derived data according to the first usage, the master key identification, the first value and the master key algorithm, execute Step 217.

In Embodiment 2, the working key usage includes: key encrypting, PIN code encrypting, Mac generating, Mac authenticating, Mac generating and authenticating, data encrypting, data decrypting, data encrypting and decrypting, key deriving, the values corresponding to the working key usage are: 0x00 0x02, 0x10 0x00, 0x20 0x00, 0x20 0x01, 0x20 0x02, 0x30 0x00, 0x30 0x01, 0x30 0x02, 0x80 x00.

In Embodiment 2, for example, the first usage specifically is: PIN code encrypting.

For example, the value corresponding to the PIN code encrypting is: 0x10 0x00;
the master key identification is: 0FFFF9876543210E;
the first value is: 00010004;
the master key algorithm is: AES-256; and
the generated second derived data is: 01 01 10 00 00 04 01 00 65 43 21 0e 00 01 00 04.

Step 217, the terminal acquires algorithm of the working key according to the operating instruction, determines length of the working key according to the algorithm of the working key, determines multiple of the length of the working key and the second derived data length, if the multiple is an integral multiple, execute Step 218; if the multiple is a non-integral multiple, execute Step 219.

In Embodiment 2, if the length of the working key is 16 bytes, the length of the second derived data is 16 bytes, the multiple of the length of the working key and the length of the second derived data is 1; if the length of the working key is 24 bytes, the length of the second derived data is 16 bytes, the multiple of the length of the working key and the length of the second derived data is 1.5; if the length of the working key is 32 bytes, the length of the second derived data is 16 bytes, the multiple of the length of the working key and the length of the second derived data is 2.

In Embodiment 2, the algorithm of the working key can include: AES-128, AES-192, AES-256, 3DES128, 3DES192.

In Embodiment 2, the algorithm of the working key is AES-128 or 3DES128, the length of the working key is 16 bytes, if the algorithm of the working key is AES-192 or 3DES192, the length of the working key is 24 bytes, if the algorithm of the working key is AES-256, the length of the working key is 32 bytes.

Step 218, the terminal generates a derived data group containing the integral multiple number of data units according to the second derived data, acquires data in the working key buffer and regards the acquired data as a second key, encrypts each data unit of the derived data group according to the second key, concatenates obtained ciphertext orderly to obtain data conformed to the derived key length, updates the data in the working key buffer to be the data conformed to the derived key length, go back to Step 220.

In Embodiment 2, generating a derived data group containing the integral multiple number of data units according to the second derived data specifically includes:
Step P1, initializing sequence number of a current data unit, regarding the second derived data as a data unit of the derived data group;
Step P2, determining whether the number of the data units of the derived data group equals to an integral multiple, if yes, generating process is ended; otherwise, execute Step P3; and
Step P3, updating the sequence number of the current data unit, modifying a preset byte of the second derived data to be the sequence number of the current data unit, takes the modified derived data as a data unit of the derived data group, go back to Step P2.

In Embodiment 2, for example, if the working key algorithm is AES-128,
the second key is: 78 bc fa c1 46 e1 98 82 5f fd 68 98 b3 63 9f 68 d4 f3 1d de dd 84 8a if b719 ad 18 19 2f b4 69; and
the second derived data is: 01 01 10 00 00 02 00 80 65 43 21 0e 00 01 00 04.

In this case, the working key length is 16 bytes, determining that the multiple of the target key length, i.e. 16 bytes, and the second derived data length, i.e. 16 bytes, is 1; generating a derived data group, i.e. 01 01 10 00 00 02 00 80 65 43 21 0e 00 01 00 04, which containing an integral multiple number, i.e. 1, of data unit according to the second derived data, encrypting the data unit of the derived data group according to the second key, i.e. 78 bc fa c1 46 e1 98 82 5f fd 68 98 b3 63 9f 68 d4 f3 1d de dd 84 8a 1f b719 ad 18 19 2f b4 69, to obtain ciphertext, i.e. b9 61 1c 8a 12 ee 0e 60 5f 5e dd 8d 82 00 48 58; the ciphertext is the working key conformed to the working key length.

In Embodiment 2, for example, if the working key algorithm is 3DES128, the second key is: 78 bc fa c1 46 e1 98 82 5f fd 68 98 b3 63 9f 68 d4 f3 1d de dd 84 8a 1f b7 19 ad 1819 2f b4 69: and the second derived data is: 01 01 10 00 00 00 00 80 65 43 21 0e 00 01 00 04.

In this case, the working key length is 16 bytes, determining that the multiple of the target key length, i.e. 16 bytes, and the second derived data length, i.e. 16 bytes, is 1; generating a derived data group, i.e. 01 01 10 00 00 00 00 80 65 43 21 0e 00 01 00 04, which containing an integral multiple number, i.e. 1, of data unit according to the second derived data, encrypting the data unit of the derived data group according to the second key, i.e. 78 bc fa c1 46 e1 98 82 5f fd 68 98 b3 63 9f 68 d4 f3 1d de dd 84 8a 1f b719 ad 18 19 2f b4 69, to obtain ciphertext, i.e. 22 bf 4a 3b a1 bd de 17 ab 5c 77 fa cf 7d 84 34; the ciphertext is the working key conformed to the working key length.

In Embodiment 2, for example, if the working key algorithm is AES-256, the second key is: 78 bc fa c1 46 e1 98 82 5f fd 68 98 b3 63 9f 68 d4 f3 1d de dd 84 8a if b7 19 ad 18 19 2f b4 69; and the second derived data is: 01 01 10 00 00 04 01 00 65 43 21 0e 00 01 00 04.

In this case, the working key length is 32 bytes, determining that the multiple of the working key length, i.e. 32 bytes, and the second derived data length, i.e. 16 bytes, is 2; generating a derived data group, i.e. 01 01 10 00 00 04 01 00 65 43 21 0e 00 01 00 04, 01 02 10 00 00 04 01 00 65 43 21 0e 00 01 00 04, which containing an integral multiple number, i.e. 2, of data units according to the second derived data, encrypting each data unit of the derived data group according to the second key, i.e. 78 bc fa c1 46 e1 98 82 5f fd 68 98 b3 63 9f 68 d4 f3 1d de dd 84 8a 1fb719 ad 18 19 2f b4 69, to obtain ciphertext, i.e. 0b da ce 08 8f 7c 42 2a 1a e7 e9 5a 84 d8 0f af, 90 bf 6f d7 6b 04 78 b0 e5 9c ec d5 ed 89 a9 b5; concatenating the obtained ciphertext to obtain the working key, i.e. 0b da ce 08 8f 7c 42 2a 1a e7 e9 5a 84 d8 0f af 90 bf 6f d7 6b 04 78 b0 e5 9c ec d5 ed 89 a9 b5, conformed to the working key length.

Step 219, the terminal rounds up the non-integral multiple to obtain an integral multiple, generates a derived data group containing the integral multiple number of data units according to the second derived data, acquires a second key in the working key buffer and regards the acquired data as a second key, encrypts each data unit of the derived data group according to the second key, concatenates obtained ciphertext orderly, takes data with length equal to working key length from the concatenated ciphertext as the working key, updates the data in the working key buffer to be the working key, execute Step 220.

In Embodiment 2, for example, if the working key algorithm is AES-192.

The second key is: 78 bc fa c1 46 e1 98 82 5f fd 68 98 b3 63 9f 68 d4 f3 1d de dd 84 8a 1f b719 ad 18 19 2f b4 69; and the second derived data is: 01 01 10 00 00 03 00 c0 65 43 21 0e 00 01 00 04.

In this case, the working key length is 24 bytes, determining that the multiple of the working key length, i.e. 24 bytes, and the second derived data length, i.e. 16 bytes, is 1.5; rounding up the non-integral multiple, i.e. 1.5 to obtain an integral multiple, i.e. 2, generating a derived data group, i.e. 01 01 10 00 00 03 00 c0 65 43 21 0e 00 01 00 04, 01 02 10 00 00 03 00 c0 65 43 21 0e 00 01 00 04, which containing the integral multiple number, i.e. 2, of data units according to the second derived data, encrypting each data unit of the derived data group according to the second key, i.e. 78 bc fa c1 46 e1 98 82 5f fd 68 98 b3 63 9f 68 d4 f3 1d de dd 84 8a 1f b719 ad 18 19 2f b4 69, to obtain ciphertext, i.e. 4a e1 03 5d 2a 41 e8 6d 43 88 60 8e 75 20 891d, e0 f2 04 22 bc bf 4f c9f0 71 8e 98 39 a6 5d 78; concatenating the ciphertext orderly to obtain 4a e1 03 5d 2a 41 e8 6d 43 88 60 8e 75 20 89 1d e0 f2 04 22 bc bf 4f c9f0 71 8e 98 39 a6 5d 78, taking data, i.e. 4a e1 03 5d 2a 41 e8 6d 43 88 60 8e 75 20 891 d e0 f2 04 22 bc bf 4f c9, of which length equals to the working key length, from the concatenated ciphertext as the working key.

In Embodiment 2, for example, if the working key algorithm is 3DES192;

the second key is: 78 bc fa c1 46 e1 98 82 5f fd 68 98 b3 63 9f 68 d4 f3 1d de dd 84 8a 1f b719 ad 18 19 2f b4 69; and the second derived data is: 01 01 10 00 00 01 00 c0 65 43 21 0e 00 01 00 04.

In this case, the working key length is 24 bytes, determining that the multiple of the working key length, i.e. 24 bytes, and the second derived data length, i.e. 16 bytes, is 1.5; rounding up the non-integral multiple, i.e. 1.5 to obtain an integral multiple, i.e. 2, generating a derived data group, i.e. 01 01 10 00 00 01 00 c0 65 43 21 0e 00 01 00 04, 01 02 10 00 00 01 00 c0 65 43 21 0e 00 01 00 04, which containing the integral multiple number, i.e. 2, of data units according to the second derived data, encrypting each data unit of the derived data group according to the second key, i.e. 78 bc fa c1 46 e1 98 82 5f fd 68 98 b3 63 9f 68 d4 f3 1d de dd 84 8a 1fb7 19 ad 18 19 2f b4 69, to obtain ciphertext, i.e. ce c4 a2 88 55 84 57 2b 31 24 31 04 f0 92 6f dc, 40 30 78 db 14 e0 6f ae 2f b1 63 f7 7f 07 6f 17; concatenating the ciphertext orderly to obtain ce c4 a2 88 55 84 57 2b 31 24 31 04 f0 92 6f dc 40 30 78 db 14 e0 6f ae 2f b1 63 f7 7f 07 6f 17, taking data, i.e. ce c4 a2 88 55 84 57 2b 31 24 31 04f0 92 6f dc 40 30 78 db 14 e0 6f ae, of which length equals to the working key length, from the concatenated ciphertext as the working key.

Step 220, the terminal performs corresponding operating according to the operating instruction and the working key, returns an operating result to the host.

In Embodiment 2, the data in the working key buffer includes: PIN code encrypting key, Mac check value generating key, Mac check value authenticating key, data encrypting key, data decrypting key, data encrypting and decrypting key, key deriving key, etc.

In Embodiment 2, taking data encrypting as an example, the operating instruction received by the terminal is: 25 20 00 00 00 13 00 01 30 00 06 01 00 00 00 08 01 02 03 04 05 06 07 08 02.

Specifically, the terminal parsing the operating instruction to obtain working key usage, working key algorithm identification, length of data to be encrypted, data to be encrypted.

In this case, the first byte and the second byte in the operating instruction are command type and command code, which are for identifying data encrypting/decrypting command; the third byte in the operating instruction is operating code, for example, 00 represents encrypting; 01 represents decrypting; the fourth byte in the operating instruction is a fixed value; the fifth byte and the sixth byte in the operating instruction represent data length, the high byte is at the front, the low byte is at behind, it supposed to be 19 bytes; the seventh byte and the eighth byte in the operating instruction represent the master key index, for example, 0001; the ninth byte and the tenth byte in the operating instruction represent working key usage, for example, 3000; the eleventh byte in the operating instruction is working key algorithm identification, for example, 06 represents AES-256 algorithm; the twelfth byte in the operating instruction is algorithm mode, for example, 01 represents ECB mode; the thirteenth byte and fourteenth byte in the operating instruction represent initial vector length, not using, for example, 0000; the fifteenth byte and the sixteenth byte in the operating instruction represent data content, for example, 0102030405060708; the twenty-fifth byte in the operating instruction is filling mode, for example, 02.

In Embodiment 2, if the operating instruction is for encrypting data, performing corresponding operation according to the operating instruction and the data in the working key buffer, returning operating result to the host specifically is: the terminal acquires data to be encrypted in the operating instruction, takes the data in the working key buffer as key, encrypts the data to be encrypted according to the key and a preset encrypting algorithm to obtain ciphertext, returns the ciphertext to the host.

In the present invention, determining algorithm of the working key and the working key usage according to the operating instruction sent from the host and generating different working keys according to different working key algorithm and working key usage, performing iteration and updating on the data in the working key buffer according to the shift register in a process of generating a working key in order to ensure that the working key generated is unique in each operating process. Comparing with an encrypting solution of prior art, i.e., generating a working key by always using same algorithm for generating a master key according to a fixed master key and a fixed master key algorithm, the method provided in the present application is safer and is more widely used.

Embodiment 3

Figure 5:
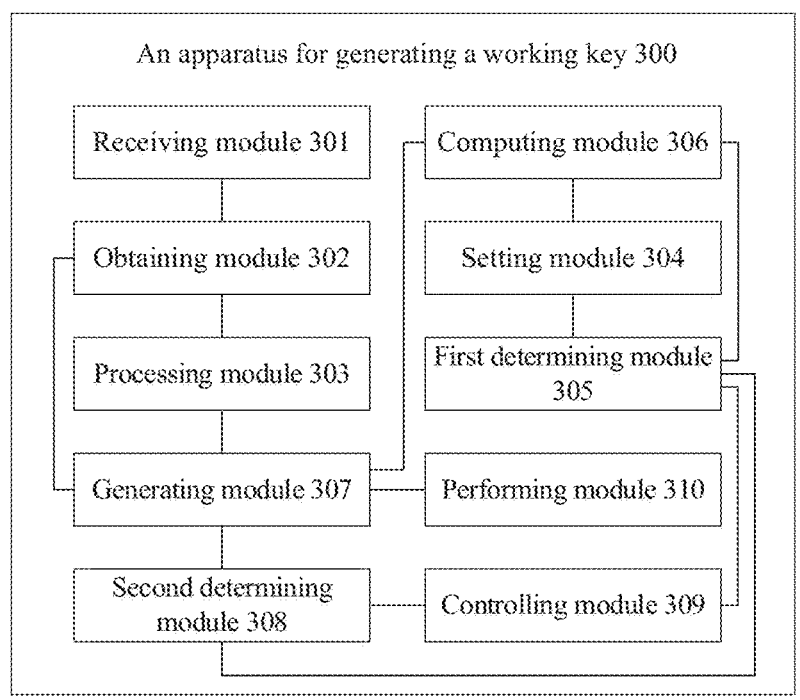
FIG. 5 is a block diagram of a method for generating a working key of Embodiment 3 of the present invention.

Based on the technical solution according to the above method for generating a working key of the present invention, the present invention provides an apparatus for generating a working key. As shown in FIG. 5, the structural diagram of the apparatus is presented. According to the present invention, an apparatus of working key 300 can include:

a receiving module 301 configured to receive an operating instruction sent from a host;

an acquiring module 302 configured to acquire a master key value, a master key counter value and a master key algorithm according to a key index in the operating instruction;

a processing module 303 configured to process the master key counter value according to a first preset algorithm to obtain a master key identification and a first value;

a setting module 304 configured to initialize a working key buffer, store the master key value in the working key buffer, set the working key counting value, initialize a shift register, set a current bit of the shift register;

a first determining module 305 configured to determine whether value of a bit, which corresponds to the current bit of the shift register, in the first value equals to a second preset value;

a computing module 306 configured to perform computation according to the value of the current shift register and the working key counting value to obtain a first result, update the working key counting value to be the first result;

a generating module 307 configured to generate a first derived data according to the master key identification, the updated working key counting value and the master key algorithm;

the generating module 307 further configured to determine derived key length according to the master key algorithm, take data in the working key buffer as a first key, generate data conformed to the derived key length according to the first key and the first derived data, update the data in the working key buffer to be the data conformed to the derived key length;

a second determining module 308 configured to determine whether the current bit of the shift register is the last bit of the shift register;

a controlling module 309 configured to control the shift register to shift bit according to preset direction, update the current bit of the shift register when the second determining module determines that the current bit of the shift register is not the last bit of the shift register, the generating module 307 further configured to set the working key usage to be a first usage according to the operating instruction, generate a second derived data according to the first usage, the master key identification, the first value and the master key algorithm;

the generating module 307 further configured to acquire a working key algorithm according to the operating instruction, determine a working key length according to the working key algorithm, take data in the working key buffer as a second key, and generate a working key according to the second key and the second derived data; and a performing module 310 configured to perform corresponding operation according to the operating instruction and the working key, return an operating result to the host.

According to another embodiment of the present invention, an electronic device is provided, which includes a storage configured to store non-volatile computer readable instructions, and a processor configured to run the non-volatile computer readable instructions to enable the processor to perform the method for generating a working key when the computer readable instructions executed by the processor.

According to another embodiment of the present invention, a computer readable storage medium configured to store non-volatile computer readable instructions is provided, when the computer readable instructions run on the computer to enable the computer to perform the method for generating a working key.

The computer readable storage medium according to the present invention can be adapted to any embodiment of the method for generating a working key described above. No more detail is given here.

A method and apparatus for generating a working key and a computer-readable medium is described in details above. The above description of the embodiments is merely to assist in understanding the method of the present disclosure and its core idea. At the same time, one of ordinary skill in the art might make various modifications on specific embodiments or its application scope according to the idea of the present disclosure. Thus, the content of the description above is not limit to the claimed scope of protection.

The invention claimed is:

1. A method for generating a working key by a terminal, comprising the following steps:
   S1) receiving an operating instruction sent from a host, acquiring a master key value, a master key counter value and a master key algorithm in a key container according to a key index in the operating instruction;
   S2) processing the master key counter value according to a first preset algorithm to obtain a master key identification and a first value;
   S3) initializing a working key buffer, storing the master key value in the working key buffer, setting a working key counting value, initializing a shift register, and setting a current bit of the shift register;
   S4) determining whether in the first value, a value of a bit which corresponds to the current bit of the shift register equals to a second preset value, when yes, executing Step S5; otherwise, executing Step S8;
   S5) performing computation according to the value of the current shift register and the working key counting value to obtain a first result, and updating the working key counting value to be the first result, then executing Step S6;
   S6) generating a first derived data according to the master key identification, the updated working key counting value and the master key algorithm;
   S7) determining a derived key length according to the master key algorithm, taking data in the working key buffer as a first key, generating data conformed to the derived key length according to the first key and the first derived data, and updating the data in the working key buffer to be the data conformed to the derived key length, then executing Step S8;
   S8) determining whether the current bit of the shift register is the last bit of the shift register, when yes, executing Step S9, when no, controlling the shift register to shift bit according to a preset direction, and updating the current bit of the shift register, then going back to Step S4;
   S9) setting a working key usage to be a first usage according to the operating instruction, generating a second derived data according to the first usage, the master key identification, the first value and the master key algorithm, then executing Step S10; and
   S10) acquiring a working key algorithm according to the operating instruction, determining a working key length according to the working key algorithm, taking data in the working key buffer as a second key, generating a working key with the working key length according to the second key and the second derived data, performing corresponding operation according to the operating instruction and the working key, and returning an operating result to the host.

2. The method of claim 1, wherein Step S2 specifically comprises:
   separating the master key counter value into two parts, regarding a first preset byte as a master key identification, while regarding a second preset byte as a first value.

3. The method of claim 1, wherein performing computation according to the value of the current shift register and the working key counting value to obtain a first result specifically comprises:
   performing computation on the value of the current shift register and the working key counting value according to a third preset algorithm to obtain a first result.

4. The method of claim 1, wherein generating a first derived data according to the master key identification, the updated working key counting value and the master key algorithm specifically comprises:
   generating the first derived data according to key derived usage, the master key identification, the updated working key counting value and the master key algorithm; and the key derived usage specifically is a value for representing that a key usage is a key derivation.

5. The method of claim 4, wherein generating the first derived data according to key derived usage, the master key identification, the updated working key counting value and the master key algorithm specifically comprises:
   concatenating a fourth preset value, the key derived usage, a value corresponding to the master key algorithm, a preset byte value of the master key identification and the updated working key counting value orderly to obtain data with a preset length.

6. The method of claim 1, wherein generating the data conformed to the derived key length according to the first key and the first derived data specifically comprises:
   regarding the data conformed to the derived key length as a target key, determining a multiple of the length of the target key and the first derived data length, generating a first derived data group according to the multiple and the first derived data, and encrypting the first derived data group according to the first key to obtain the data conformed to the derived key length.

7. The method of claim 6, wherein when the multiple is an integral multiple, generating the first derived data group according to the multiple and the first derived data, and encrypting the first derived data group according to the first key to obtain the data conformed to the derived key length specifically comprises:
   generating the first derived data group containing the integral multiple of data units according to the first derived data, encrypting each data unit of the derived data group according to the first key, and concatenating ciphertext obtained orderly to obtain the data conformed to the derived key length.

8. The method of claim 6, wherein when the multiple is a non-integral multiple, generating the first derived data group according to the multiple and the first derived data, and encrypting the first derived data group according to the first key to obtain the data conformed to the derived key length specifically comprises:
   rounding up the non-integral multiple to obtain an integral multiple, generating a derived data group containing the integral multiple number of data units according to the first derived data, encrypting each data unit of the derived data group according to the first key, concatenating obtained ciphertext orderly, and taking data with length of target key length from a concatenated ciphertext as the data conformed to the derived key length.

9. The method of claim 1, wherein in Step S9, generating the second derived data according to the first usage, the master key identification, the first value and the master key algorithm specifically comprises:
   concatenating a fourth preset value, the first usage, the value corresponding to the master key algorithm, a preset byte value of the master key identification and the first value orderly, to obtain data with a preset length.

10. The method of claim 1, wherein generating the working key according to the second key and the second derived data specifically comprises:

determining a multiple of the working key length and the second derived data length, generating a second derived data group according to the multiple and the second derived data, and encrypting the second derived data group according to the second key, to obtain the working key conformed to the working key length.

11. The method of claim 10, wherein when the multiple is an integral multiple, generating the second derived data group according to the integral multiple and the second derived data, and encrypting the second derived data group according to the second key to obtain the working key conformed to the working key length specifically comprises:
generating the derived data group containing the integral multiple of data units according to the second derived data, encrypting each data unit of the derived data according to the second key, concatenating those ciphertext obtained in order, to obtain the working key conformed with the working key length.

12. The method of claim 10, wherein when the multiple is a non-integral multiple, generating the second derived data group according to a rounded integral and the second derived data, and encrypting the second derived data group according to the second key to obtain a working key conformed to the working key length specifically comprises:
rounding up the non-integral multiple to obtain an integral multiple, generating the derived data group containing the integral multiple number of data units according to the second derived data, encrypting each data unit of the derived data group according to the second key, concatenating those ciphertext obtained orderly, and taking data with a length equal to the working key length from the concatenated ciphertext as the working key conformed to the working key length.

13. The method of claim 1, wherein determining whether in the first value, the value of the bit, which corresponds to the current bit of the shift register equals to the second preset value specifically is:
performing computation on the value of the current bit of the shift register and the value of the bit, which corresponds to the current bit of the shift register, in the first value according to a second preset algorithm, and determining whether in the first value, the value of the bit, which corresponds to the current bit of the shift register equals to the second preset value.

14. A non-transitory computer readable storage medium for generating a working key, wherein:
the non-transitory computer readable storage medium is configured to store computer readable instructions, and when the computer readable instructions are run on a computer, enable the computer for:
S1) receiving an operating instruction sent from a host, acquiring a master key value, a master key counter value and a master key algorithm in a key container according to a key index in the operating instruction;
S2) processing the master key counter value according to a first preset algorithm to obtain a master key identification and a first value;
S3) initializing a working key buffer, storing the master key value in the working key buffer, setting a working key counting value, initializing a shift register, and setting a current bit of the shift register;
S4) determining whether in the first value, a value of a bit, which corresponds to the current bit of the shift register equals to a second preset value, when yes, executing Step S5; otherwise, executing Step S8;
S5) performing computation according to the value of the current shift register and the working key counting value to obtain a first result, and updating the working key counting value to be the first result, then executing Step S6;
S6) generating a first derived data according to the master key identification, the updated working key counting value and the master key algorithm;
S7) determining a derived key length according to the master key algorithm, taking data in the working key buffer as a first key, generating data conformed to the derived key length according to the first key and the first derived data, and updating the data in the working key buffer to be the data conformed to the derived key length, then executing Step S8;
S8) determining whether the current bit of the shift register is the last bit of the shift register, when yes, executing Step S9, when no, controlling the shift register to shift bit according to a preset direction, and updating the current bit of the shift register, then going back to Step S4;
S9) setting a working key usage to be a first usage according to the operating instruction, generating a second derived data according to the first usage, the master key identification, the first value and the master key algorithm, then executing Step S10; and
S10) acquiring a working key algorithm according to the operating instruction, determining a working key length according to the working key algorithm, taking data in the working key buffer as a second key, generating a working key with the working key length according to the second key and the second derived data, performing corresponding operation according to the operating instruction and the working key, and returning an operating result to the host.

15. An electronic device for generating a working key, wherein the electronic device comprises:
a storage configured to store computer readable instructions, and
a processor configured to run the computer readable instructions to enable the processor to:
S1) receive an operating instruction sent from a host, acquire a master key value, a master key counter value and a master key algorithm in a key container according to a key index in the operating instruction;
S2) process the master key counter value according to a first preset algorithm to obtain a master key identification and a first value;
S3) initialize a working key buffer, store the master key value in the working key buffer, set a working key counting value, initialize a shift register, and set a current bit of the shift register;
S4) determine whether in the first value, a value of a bit which corresponds to the current bit of the shift register equals to a second preset value, when yes, execute Step S5; otherwise, execute Step S8;
S5) perform computation according to the value of the current shift register and the working key counting value to obtain a first result, and update the working key counting value to be the first result, then executing Step S6;
S6) generate a first derived data according to the master key identification, the updated working key counting value and the master key algorithm;
S7) determine a derived key length according to the master key algorithm, take data in the working key buffer as a first key, generate data conformed to the derived key length according to the first key and the first derived data, and update the data in the working key buffer to be the data conformed to the derived key length, then execute Step S8;

S8) determine whether the current bit of the shift register is the last bit of the shift register, when yes, execute Step S9, when no, control the shift register to shift bit according to a preset direction, and update the current bit of the shift register, then going back to Step S4;

S9) set a working key usage to be a first usage according to the operating instruction, generate a second derived data according to the first usage, the master key identification, the first value and the master key algorithm, then execute Step S10; and S10) acquire a working key algorithm according to the operating instruction, determine a working key length according to the working key algorithm, take data in the working key buffer as a second key, generate a working key with the working key length according to the second key and the second derived data, perform corresponding operation according to the operating instruction and the working key, and return an operating result to the host.

* * * * *